United States Patent Office 2,796,340
Patented June 18, 1957

2,796,340

PROCESS FOR ROASTING SULFIDE ORE CONCENTRATES

Howard M. Cyr, Charles W. Siller and Tracey F. Steele, Palmerton, Pa., assignors to The New Jersey Zinc Company, New York, N. Y., a corporation of New Jersey No Drawing. Application February 4, 1954,
Serial No. 408,294

6 Claims. (Cl. 75—3)

This invention relates to the roasting of iron sulfide ore such as pyrite and pyrrhotite ores and concentrates.

In our United States Patent No. 2,621,118, there is described and claimed a method of roasting sulfides such as zinc sulfide ore concentrates. This method is characterized by the maintenance of a plurality of contiguous fluid beds of different degrees of fluid agitation by the introduction of the roasting air at a plurality of vertically spaced points in a column of the sulfide to be roasted. As pointed out in the patent, the sulfide charge should be in the form of discrete particles small enough to permit their suspension in the roasting air in the form of a fluid bed but large enough to prevent their being blown out of the top of the fluidized column.

In carrying out the aforesaid method for the roasting of pyrite, we have found that the volatilization of the labile sulfur of the pyrite induces excessive disintegration of a pelleted charge of the pyrite flotation concentrate having the desired size range unless large amounts of binders are used. As a consequence, a large proportion of the roasted pyrite charge was carried out of the top of the column with the roaster gases. In the course of further study of the fluid bed roasting of pyrite, we therefore investigated the possibility of roasting the pyrite in finely divided form and of recovering the roasted product in a dust-like form carried out of the column with the roaster gases. We found that this could be accomplished by first establishing the aforementioned type of multi-bed fluid column composed of large particles of previously roasted pyrite and by then introducing the finely divided pyrite concentrate into the interior of the fluid column. By controlling the amount of air and pyrite introduced into the fluid column so as to maintain a temperature therewithin of about 900° to 1000° C., we found that effective roasting of the pyrite could be achieved with the resulting production of a dust-like iron oxide product composed predominantly of $Fe_2O_3$ and low in total sulfur content.

In further investigation of the variables in such a method of roasting finely divided pyrite such as a flotation concentrate, we discovered that at a somewhat higher temperature, and within a relatively narrow temperature range, the mechanism of the roasting operation was radically altered. Thus, at roasting temperature of 1040° to 1060° C., the finely divided pyrite charge actually agglomerated without appreciably building up the size of the relatively coarse particles of roasted pyrite to form a roasted product which was predominantly in the same form and particle size range as that of the starting particles of the fluidized column. The roasted pyrite product thus remained in the column and could be withdrawn continuously or intermittently from the lower portion of the column in pelleted form and composed primarily of magnetite ($Fe_3O_4$) low in total sulfur content.

The method of our present invention comprises introducing roasting air into at least two vertically spaced points in a vertically disposed column of a previously roasted sulfide of this type in the form of discrete particles having a predominant size ranging between about 6 and 35 mesh, and introducing into the interior of the resulting multi-bed fluidized column a charge of the finely divided sulfide. The rate of introduction of the sulfide charge into the column is so adjusted as to maintain the temperature of the column at the incipient fusion temperature of the sulfide. The resulting roaster gas is removed from the upper portion of the column, and the roasted sulfide is removed from the lower portion of the column in the form of discrete particles of the aforesaid size.

The relatively coarse particles of roasted sulfide used as the fluidized mass into which the finely divided sulfide particles are charged may be derived from any source. The only prerequisite for the chemical composition of these coarse particles is that they be composed predominantly of the oxide of the metal whose sulfide is to be roasted by our method, and the essential physical characteristic of these particles is that they be reasonably strong pellets or granules having a particle size ranging between about 6 and 35 mesh (Tyler standard) and advantageously a mixture of sizes within this range. Such oxidic particles may be derived from any source, either as a result of roasting sulfide pellets or as a result of pelleting a previously roasted sulfide. Of course, after the method of our invention has been in operation for an appreciable period of time, the roasted sulfide pellets or granules in the fluid column will be those which have been formed during the preceding operation in the practice of our method. Thus, after the starting-up phase of our method has been passed, the only raw material requirements are a supply of the finely divided sulfide and a supply of roasting air.

The roasting air is supplied to the column of relatively coarse oxide particles in the manner described in our aforementioned patent. That is, the roasting air is delivered to the column in the form of two or more separate portions introduced into vertically spaced points in the column. The total amount of air required for the practice of our invention may be varied according to the result to be achieved, but in general we prefer to use an amount of roasting air totaling about 5 to 20%, and usually about 10 to 15%, in excess of that theoretically required to convert the sulfide charge to the corresponding oxide. The distribution of this amount of air between the vertically spaced air supply inlets in the column may vary considerably within the prescriptions set forth in our aforementioned patent. In general, this air distribution is such as to support the mass of particles in the lower portion of the column in an expanded fluid condition having an apparent density of about 75 to 90% of the unexpanded bulk density of the fluidized particles and to support a contiguous portion of the column thereabove in a more expanded fluid condition having an apparent density less than that in the lower portion of the column but within the range of about 55 to 75% of the unexpanded bulk density of the fluidized particles. Where the roasting air supply is distributed in the form of three separate portions, the air supply to the uppermost portion is preferably so controlled as to establish in the fluidized mass above the two aforementioned portions a still greater degree of fluid agitation by an expanded fluid condition having an apparent density less than that prevailing in the contiguous fluidized zone directly therebeneath but within the range of about 40 to 60% of the unexpanded bulk density of the fluidized particles. The resulting column of roasted or calcined sulfide particles is characterized by the existence therein of a plurality of contiguous fluid beds of sufficiently different degrees of expanded fluid agitation as to substantially prevent short-circuiting of the particles from one bed to another while permitting fluid flow of the particles by gravity progressively downwardly through these beds unimpeded by grates or other such bed-supporting mechanical devices. And as described in our aforementioned patent, we have found it advisable to provide the uppermost end of the column with a section of enlarged cross-section such that gases rising upwardly from the fluidized column provide in the enlarged upper section an expanded fluid condition substantially the same as that of the lowermost portion of the column. The resulting relatively quiescent fluidized charge in the upper portion of the enlarged cross-section serves to prevent an excessive loss of fines which might otherwise result from the relatively high gas velocity in the uppermost portion of the fluidized column.

The finely divided sulfide charge is delivered to the fluid column at any point therein appreciably below the upper surface of the uppermost fluid bed. The point of introduction of the fine sulfide charge into the fluidized column should merely be such that the sulfide charge is not blown out of the column before it has had an opportunity to agglomerate in the presence of the fluidized particles of the column. Toward this end, we presently prefer to introduce the sulfide charge into the lower half of the fluidized column, but successful practice of our invention is achieved when the sulfide is charged to a still higher portion of the column.

The temperature of the fluidized column must be controlled so as to maintain a roasting temperature substantially below but close to that of the softening or sintering temperature of the iron sulfide charge. Inasmuch as the softening temperature of various pyrites and pyrrhotites (as determined by Seger cones) varies with their source, the optimum operating temperature for each sulfide charge will depend upon the softening point of that charge and can best be expressed as a temperature about 50° to 75° C. below the softening point of the charge. For example, five different shipments of East Sullivan pyrite had softening points ranging from 1100° C. to 1135° C. and five different shipments of Noranda pyrite had softening points ranging from 1075° to 1095° C., whereas other pyrites and pyrrhotites have been found to have softening points ranging from 1140° to 1210° C. For each of these charge materials, an operating temperature 50° to 75° C. below its softening point results in satisfactory practice of the method of our invention.

The following example of a roasting operation embodying our invention will illustrate its practice. A cylindrical retort having an internal diameter of 24 inches and 38 inches high was filled to the top with aggregates of iron oxide having a particle size ranging between about 6 mesh and about 35 mesh (Tyler standard). The retort was provided with three air inlets, one positioned at the bottom of the retort, the second positioned 14 inches above the bottom and the third positioned about 28 inches above the bottom. The upper end of the cylindrical retort was provided with an outwardly and upwardly flared portion. The charge extended upwardly into the lower section of this upper flared portion of the retort.

The iron oxide starting charge or "fill" was heated to a temperature of about 900° C. by means of the introduction of manufactured gas and combustion air in amount not only sufficient to provide this heating but also to effect fluidization of the iron oxide aggregates in the form of a fluid column. After the starting charge had been brought up to the aforesaid temperature, the gas charge was discontinued and there was begun the introduction of East Sullivan pyrite flotation concentrate into the lower portion of the column, and fluidizing and roasting air was introduced into the three air inlets. By varying the rate at which the fine pyrite charge was delivered to the column and by varying the amount of relatively coarse roasted product recirculated with this fine charge, the temperature of the column was maintained at will at a variety of different values. At each temperature, however, the entire column was maintained at a substantially uniform temperature as a result of the agitation afforded by the fluidization of the column. With operating temperatures ranging from about 900° to about 1000° C., the pyrite retained its fine degree of subdivision during roasting and the completely roasted pyrite left the top of the roasting column along with the effluent sulfur dioxide, nitrogen and excess air. As the operating temperature was raised above about 1000° C., the amount of fine roasted pyrite discharged with the effluent roaster gases diminished until at an operating temperature of about 1050° C. only about 10–20% of the roasted pyrite was removed as fines with the roaster gases. Under these latter conditions, at least about 80% of the roasted pyrite was removed from the bottom of the column in the form of aggregates having a particle size ranging between about 6 mesh and 35 mesh. Throughout the entire range of operating temperatures referred to hereinbefore, the resulting calcine was low in sulfur, and at all temperatures above 950° C. the calcine generally contained less than .01% sulfide-sulfur. Moreover, X-ray analyses of the roasted product obtained at these different operating temperatures showed that the roasted pyrite consisted predominantly of ferric oxide ($Fe_2O_3$) at roasting temperatures up to about 1025° C. and that at temperatures above about 1040°–1050° C. the calcine consisted predominantly of magnetite ($Fe_3O_4$). The importance of this determination resides in the fact that the theoretical maximum sulfur dioxide concentration is higher when the pyrite is roasted to magnetite than when it is roasted to ferric oxide. As a matter of fact, roasting operations carried out as described hereinbefore and at a temperature of about 1050° C. was about 10% excess roasting air produced an effluent roaster gas containing about 14% sulfur dioxide, the latter being close to the theoretical maximum of 14.7% sulfur dioxide when converting this pyrite to magnetite under these conditions.

The results of the foregoing tests are summarized in the following table. The runs were varied primarily only to show the effect of different operation temperatures:

*Charge analysis (East Sullivan pyrite)*

| | Percent |
|---|---|
| Fe | 44.8 |
| S | 47.1 |
| $SiO_2$ | 2.5 |
| $Al_2O_3$ | 0.91 |
| Cu | 0.41 |
| Zn | 0.36 |
| Pb | 0.11 |

*Operating conditions*

| | Run | | | | | |
|---|---|---|---|---|---|---|
| | A | B | C | D | E | F |
| Average Temperature, °C | 900 | 935 | 960 | 1,000 | 1,030 | 1,045 |
| Feed Rate, lb./hr: | | | | | | |
|   Pyrite | 451 | 513 | 535 | 598 | 658 | 685 |
|   Calcine | 125 | 158 | 200 | 80 | 178 | 135 |
| Excess Air, percent | 40 | 30 | 20 | 20 | 10 | 10 |
| Input in Lb: | | | | | | |
|   Coarse [1] | 4,355 | 4,390 | 4,505 | 4,755 | 6,966 | 6,267 |
|   Fine Pyrite [2] | 3,221 | 3,357 | 3,696 | 3,820 | 8,709 | 3,832 |
| Output in Lb: | | | | | | |
|   Fines [3] | 3,950 | 3,527 | 3,700 | 3,505 | 4,213 | 678 |
|   Coarse [1] | 3,626 | 4,220 | 4,501 | 5,070 | 11,462 | 9,421 |
| Crystal Structure— A=Hematite B=Magnetite | A | A | A | A | A+B | B |
| Increase (+) or Decrease (−) in Coarse: Lb | −729 | −170 | −4 | +315 | +4,496 | +3,154 |
| Percent Conversion of fine charge to coarse product | −22 | −5 | | 8 | 52 | 82 |

[1] This includes original "fill" plus recirculated calcine.
[2] Calculated roasted weight.
[3] Calculated—blown out top of column.

As can be seen from the foregoing table, operating temperatures below about 1000° C. tended to promote abrasion of the initial coarse charge so as to augment the amount of fines removed with the roaster gases, this fact being shown by the negative value for the "conversion" of the charge which is expressed in terms of the conversion of fines to coarse particles. Operating temperatures above about 1040° C. have been shown consistently to effect conversion of at least 75% of the fine pyrite charge to relatively coarse particles within the range of 6 to 35 mesh. Moreover, these more elevated operating temperatures, and preferably within the range of 1040° to about 1060° C., promote the roasting of the pyrite to a form of iron oxide corresponding to a magnetic iron oxide (magnetite) with concomitant advantage in the high concentration of the sulfur dioxide in the roaster gases and a corresponding enrichment of the iron content of the calcine because of the higher ratio of iron to oxygen in magnetite than in hematite. A further enrichment of the iron content of the calcine is effected during roasting by the method of our invention as a result of the tendency for about 40% or more of the gangue constituents (primarily oxides of aluminum, silicon and calcium) to leave the roaster as flue dust rather than to agglomerate into the form of pellets as the iron sulfide does as it is being roasted.

We claim:

1. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roated sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, adjusting the rate of introduction of the sulfide charge into the column so as to maintain the temperature of the column by virtue of the heat of combustion of the sulfide in the charge at the incipient fusion temperature of the sulfide close to but below the softening temperature of the sulfide with resulting adhesion of the fine charge to the aforesaid discrete particles, withdrawing roaster gas from the upper portion of the column, and withdrawing the roasted sulfide from the lower portion of the column in the form of discrete particles having a size ranging between about 6 and 35 mesh.

2. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roasted sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, adusting the rate of introduction of the sulfide charge into the column so as to maintain the temperature of the column by virtue of the heat of combustion of the sulfide in the charge at the incipient fusion temperature of the sulfide between about 50° and 75° C. below the softening temperature of the sulfide with resulting adhesion of the fine charge to the aforesaid discrete particles, withdrawing roaster gas from the upper portion of the column, and withdrawing the roasted sulfide from the lower portion of the column in the form of discrete particles having a size ranging between about 6 and 35 mesh.

3. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roasted sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, adjusting the rate of introduction of the sulfide charge into the column so as to maintain the temperature of the column by virtue of the heat of combustion of the sulfide in the charge within the range of about 1040° to 1060° C. with resulting adhesion of the fine charge to the aforesaid discrete particles, withdrawing roaster gas from the upper portion of the column, and withdrawing the roasted sulfide from the lower portion of the column in the form of discrete particles having a size ranging between about 6 and 35 mesh.

4. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roasted sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, the total amount of roasting air being about 10 to 20% in excess of that theoretically required for conversion of the sulfide to oxide, adjusting the rate of introduction of the sulfide charge into the column so as to maintain the temperature of the column by virtue of the heat of combustion of the sulfide in the charge at the incipient fusion temperature of the sulfide close to but below the softening temperature of the sulfide with resulting adhesion of the fine charge to the aforesaid discrete particles, withdrawing roaster gas from the upper portion of the column, and withdrawing the roasted sulfide from the lower portion of the column in the form of discrete particles having a size ranging between about 6 and 35 mesh.

5. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roasted sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, the total amount of roasting air being about 10 to 20% in excess of that theoretically required for conversion of the sulfide to oxide, adjusting the rate of introduction of the sulfide charge into the column so as to maintain the temperature of the column by virtue of the heat of combustion of the sulfide in the charge at the incipient fusion temperature of the sulfide within the range of about 1040° to 1060° C. with resulting adhesion of the fine charge to the aforesaid discrete particles, withdrawing roaster gas from the upper portion of the column, and withdrawing the roasted sulfide from the lower portion of the column in the form of discrete particles having a size ranging between about 6 and 35 mesh.

6. The method of roasting finely divided iron sulfide ores and concentrates of the group consisting of pyrite and pyrrhotite with the resulting production of iron oxide agglomerates having a particle size substantially larger than the size of the charged sulfide particles which comprises introducing roasting air into at least two vertically spaced points in a vertically disposed column of a previously roasted sulfide of said group in the form of relatively coarse discrete particles having a size ranging between about 6 and 35 mesh so as to effect fluidization of said column of coarse particles, introducing a charge of the finely divided sulfide into the resulting multi-bed fluidized column and appreciably below the upper surface of the uppermost fluid bed thereof, the total amount of roasting air being about 10 to 20% in excess of that theoretically required for conversion of the sulfide to oxide, adjusting the rate of introduction of the sulfide charge into the column so as to maintain the temperature of the column by virtue of the heat of combustion of the sulfide in the charge within the range of about 1040° to 1060° C. with resulting adhesion of the fine charge to the aforesaid discrete particles, withdrawing roaster gas from the upper portion of the column, withdrawing the roasted sulfide from the lower portion of the column in the form of discrete particles having a size ranging between about 6 and 35 mesh, and withdrawing in the form of flue dust containing at least about 40% of any oxides of aluminum, silicon and calcium initially accompanying the sulfide as a gangue constituent.

References Cited in the file of this patent

UNITED STATES PATENTS

| | | |
|---|---|---|
| 2,522,576 | Ingraham | Sept. 19, 1950 |
| 2,556,215 | Queneau et al. | June 12, 1951 |
| 2,561,396 | Matheson | July 24, 1951 |
| 2,563,086 | Verschoor | Aug. 7, 1951 |
| 2,586,818 | Harms | Feb. 26, 1952 |
| 2,596,580 | McKay et al. | May 13, 1952 |
| 2,621,118 | Cyr et al. | Dec. 9, 1952 |
| 2,650,159 | Tarr et al. | Aug. 25, 1953 |
| 2,677,608 | McKay et al. | May 4, 1954 |
| 2,699,375 | Johannsen et al. | Jan. 11, 1955 |
| 2,733,137 | Swaine et al. | Jan 31, 1956 |

FOREIGN PATENTS

| | | |
|---|---|---|
| 9674/32 | Australia | Oct. 16, 1933 |